UNITED STATES PATENT OFFICE.

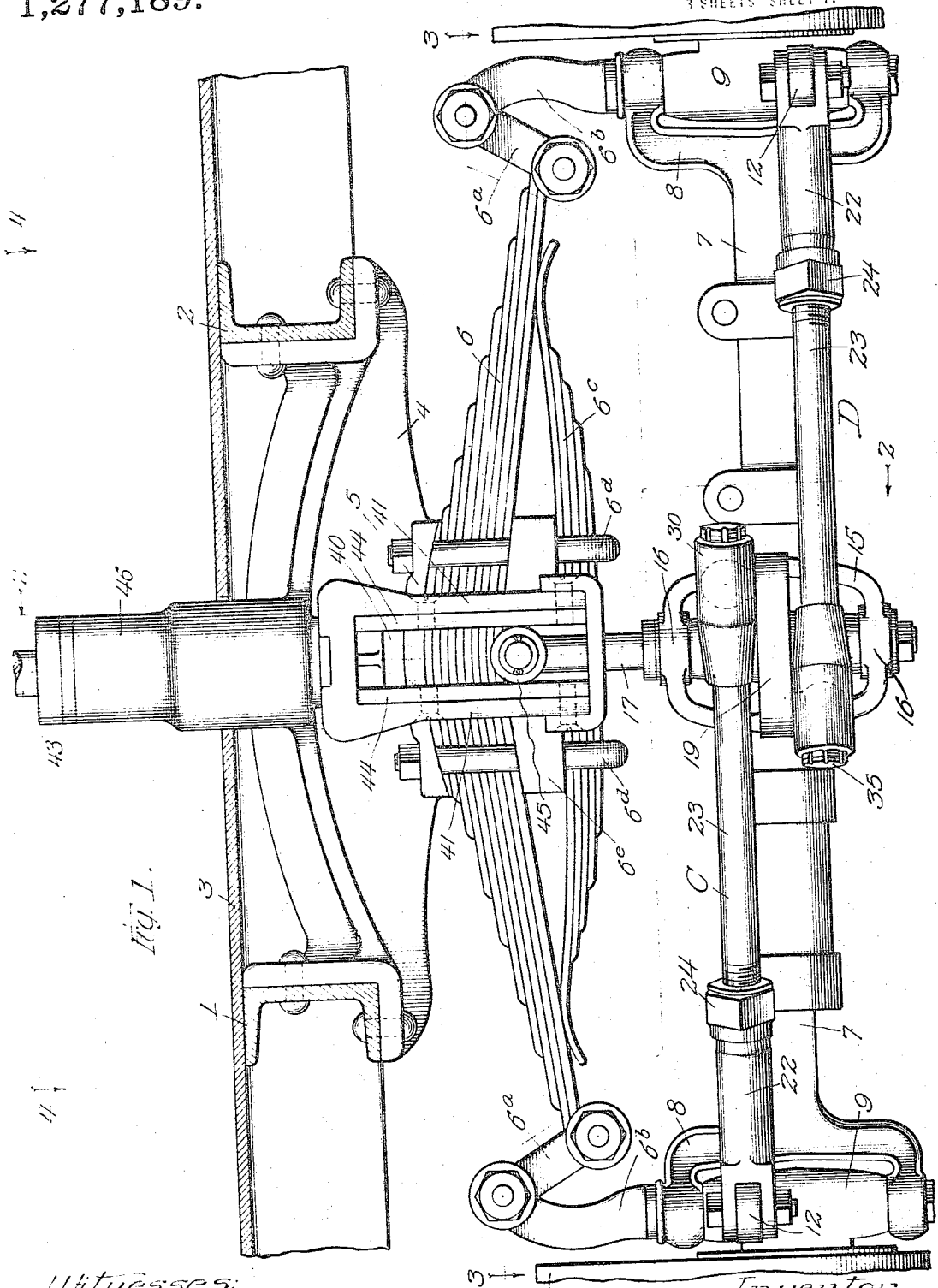

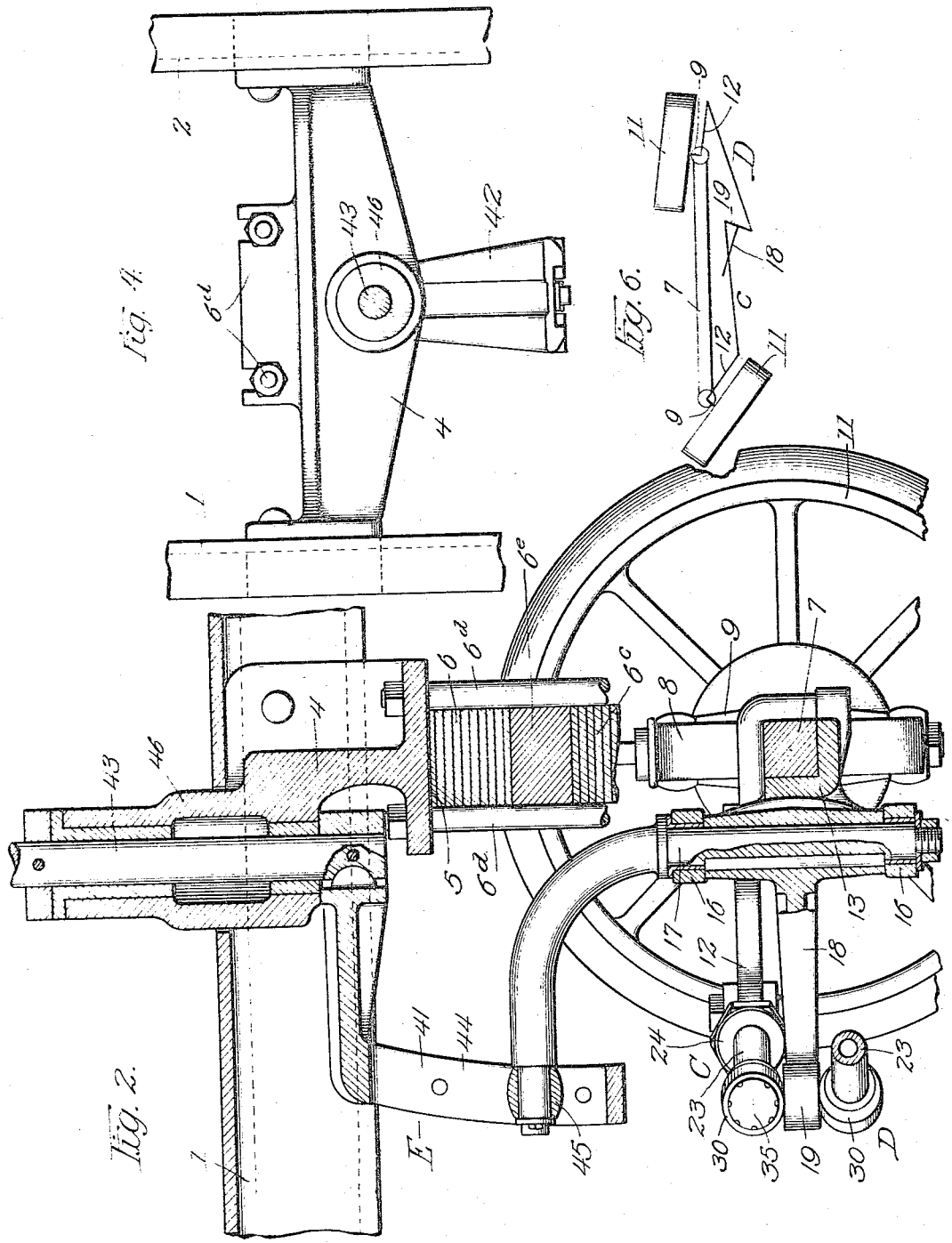

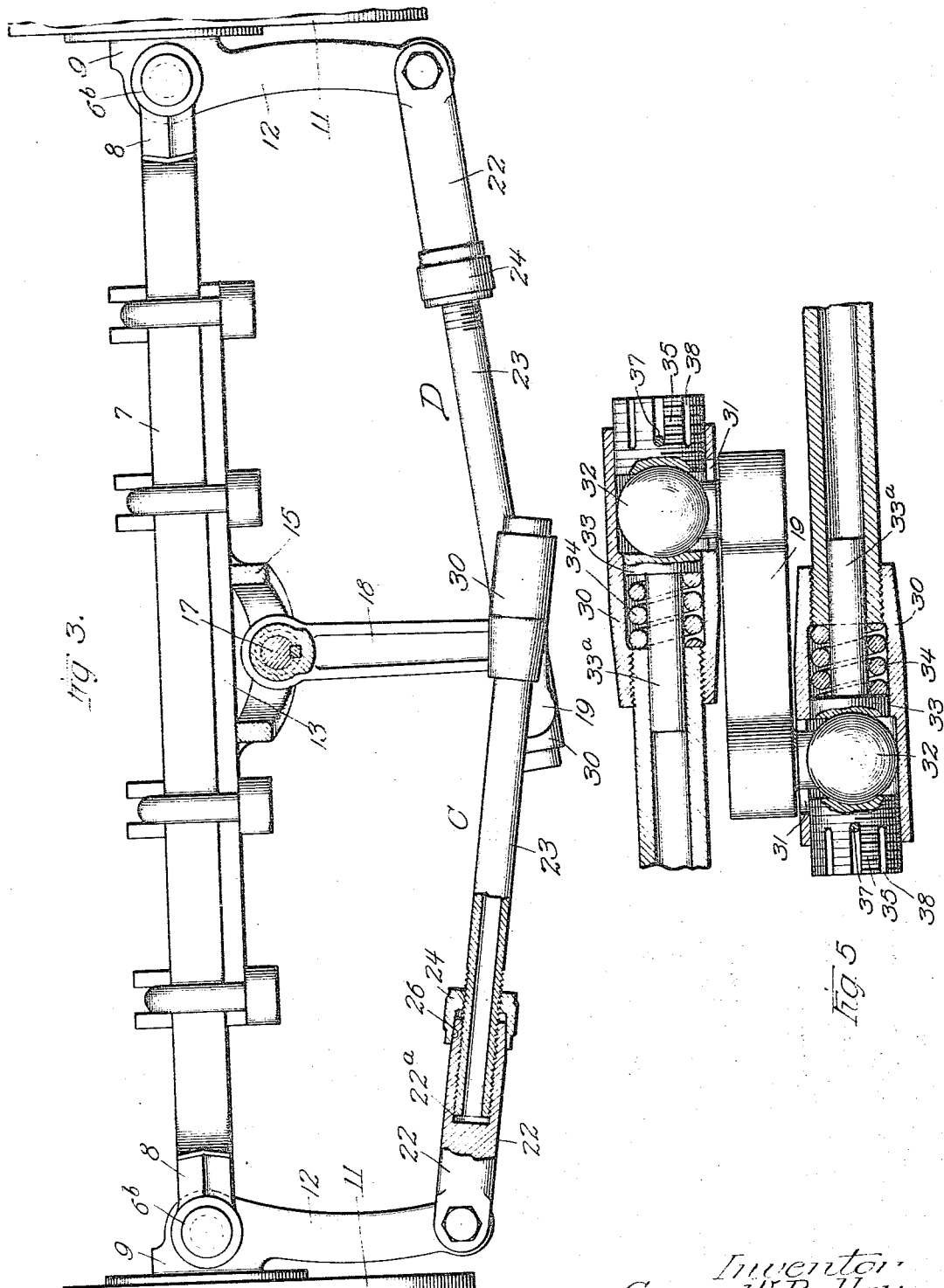

GEORGE W. BULLEY, OF CHICAGO, ILLINOIS, ASSIGNOR TO MERCURY MANUFACTURING COMPANY, OF CHICAGO, ILLINOIS, A CORPORATION OF ILLINOIS.

STEERING-GEAR.

1,277,189.　　　　Specification of Letters Patent.　　Patented Aug. 27, 1918.

Application filed November 4, 1916. Serial No. 129,434.

*To all whom it may concern:*

Be it known that I, GEORGE W. BULLEY, a citizen of the United States of America, and resident of Chicago, Cook county, Illinois, have invented a certain new and useful Improvement in Steering-Gears, of which the following is a specification.

My invention relates to improvements in steering gear for vehicles and relates more particularly to steering gear for self propelled vehicles of the truck or tractor type.

One of my objects is to provide an improved short turning gear such as will be especially applicable to industrial tractors, trucks and vehicles which because of the character of work they perform, must be capable of turning in practically in their own length.

Another object of my invention is to provide an improved steering gear for vehicles which will be simple, durable and reliable in construction and effective and efficient in operation.

Other objects of my invention will appear hereinafter.

My invention consists in the features of novelty exemplified by the construction, combination and arrangement of parts hereinafter described, shown in the accompanying drawings, and more particularly set forth in the appended claims.

Referring to the accompanying drawings:

Figure 1 is a view in front elevation of an improved steering gear construction embodying my invention;

Fig. 2 is a vertical section taken substantially on the line 2—2 of Fig. 1;

Fig. 3 is a plan view of that part of the gear which is supported by the vehicle axle, this view being taken substantially on the line 3—3 of Fig. 1.

Fig. 4 is a plan view of the arch member and steering fork, looking downwardly from substantially the line 4—4 of Fig. 1.

Fig. 5 is a detail section of the pivotal connections between the connecting links and the radius arm.

Fig. 6 is a diagrammatic view illustrating the operation of the mechanism.

The particular structure which I have shown in the drawings is designed for four-wheeled electric tractors which are used in industrial hauling of merchandise about freight platforms, wharves, warehouses and the like, but it will be obvious to one skilled in the art, after having obtained an understanding of my invention from the disclosures herein made, that the principles and functions of my invention are applicable to other and modified structures without departing from the spirit and scope of the invention, and I wish it to be so understood.

The frame of the vehicle is represented in these drawings by the channel beams 1, these beams in this particular structure being arranged in the same plane and supporting a suitable floor or platform. A transverse arch member 4 is formed at its ends to fit the beams 1 and to which its ends are secured by rivets or otherwise. This arch member has on its underside a curved seat portion 5 in which the forward vehicle springs 6 are clamped. These springs are mounted at their ends on short suspension links $6^a$ which are pivotally connected to upstanding posts or standards $6^b$ on the ends of the axle yokes and constitute a yielding connection between the vehicle body and the axle. There is also a supplemental spring $6^c$ which bears at its ends on the underside of the main spring 6 and comes into play when the load becomes abnormal or excessive. These springs are clamped in position by the U-bolts $6^d$, a spacing block $6^e$ being provided between the two springs. The axle 7 shown is simply a straight transverse bar square in cross-section and of sufficient length and divided at its ends to form yokes 8 in which the wheel hub spindles 9 are pivotally mounted, these spindles having long vertical bearings to withstand the thrusts thereon. The wheels 11 are preferably of such height that they will pass beneath the frame when turning. This construction, as shown in the diagram Fig. 6, enables each wheel when turning outwardly to swing through an angle of almost ninety degrees from the normal or straight-ahead position, thus causing the vehicle to turn as a whole in very little more than its own length; that is, on a pivotal center coincident substantially with the point of contact of the "inner" rear wheel with the ground. Each spindle bearing has an integral forwardly projecting arm 12 in substantially 90 degrees fixed relation to the spindle 9, through which arm the power is applied to the spindle to turn or steer the wheel. A bracket 13 is positioned on the forward side of and at substantially the center of the axle 7. This bracket has a loop-shaped center portion 15 standing substantially vertically and provided with bearings or journals 16 in which the vertically disposed steering crank member 17 is rotatably mounted. The vertical portion of this crank member between the upper and lower bearings 16 carries a forwardly extending radius arm or lever 18 which is keyed to it. This radius arm has a short right-angled cross-head or member 19, and extending between this cross-head and the arms 12 are connecting links C and D. These links are each composed in the main of terminal members 22 and connecting rods 23. The terminal members 22 are pivotally connected to the ends of arms 12 and their other ends are provided with threaded sockets 22ᵃ into which the threaded ends of the connecting rods 23 are screwed. This construction forms an adjustable joint by which the length of the links may be varied to adapt them to the particular conditions such as initial adjustment of the mechanism, and adjustment to compensate for wear. The two members of the link are locked in their adjusted condition by the lock nut 24 which, as shown, is screwed on the threaded end portion of the connecting rod 23 and which has a tapered socket or interior surface 26 which frictionally coöperates with a correspondingly tapered surface of the terminal member to firmly lock the parts together. The inner ends of the connecting links are pivotally connected, by means of cushion joints, to the cross head 19 on the radius arm but their pivotal points of connection are spaced apart with respect to each other. The inner ends of the connecting links C and D are threaded into hollow socket members 30 having openings 31 on one side large enough for the ball members 32 to pass through for the purpose of assembling the parts, the ball members being solidly mounted on short stems on the ends of the cross-head 19. Within the socket members are concave disks or plates 33 which bear against the ball members to provide seats for said balls, these disks being carried on stems or rods 33ᵃ which slidably fit in the ends of the hollow connecting rods. The disks or heads 33 are yieldingly pressed against the balls by springs 34. At the opposite or outer ends of the socket members are adjustable nuts 35 which likewise have concave seats at their ends bearing against the balls, these nuts being adapted to be locked in their adjusted positions by pins 37 which pass through holes in the socket members and through transverse slots 38 in the nuts. This construction provides a pivotal connection between the connecting links and the radius arm which is constantly tight and free from lost motion and rattling and which can readily be adjusted to compensate for wear. In initially adjusting these joints the nuts are turned until the springs are completely compressed and then unscrewed or eased off slightly so as to just separate the coils of the spring. These pivotal connections are positioned on opposite sides of the cross-head so that the connecting links can be connected to the ends of the cross-head farthest from their respective spindle arms 12 and still not interfere with each other,— in other words, in normal straight ahead position, the connecting links crossing each other at the cross-head. Referring to Fig. 6, it is observed that as the gear is operated to turn the wheels the pivotal connection of the link which actuates the "inner" wheel with the cross-head moves outwardly on an arc, and thus at all times maintains a wide angle between that connecting rod and its spindle arm 12. The "inner" wheel can thereby be turned to a position practically at right angles to a straight ahead position without the connecting link and spindle arm being alined and thereby locked. The upper end of the crank member 17 is turned forwardly into substantially horizontal position. Its forward end is positioned in a long slot 40 formed by the depending legs 41 of the steering fork or member E. These legs are carried on the outer end of the horizontal portion 42 of the steering fork, this arm 42 being keyed to the lower end of a vertical steering post 43. The lower ends of the steering fork legs are bridged by a U-shaped strap to close the end of the slot or loop and prevent the legs from spreading. These legs are lined on their inner sides with hardened steel plates 44 to prevent wear and in order to further reduce friction and wear the crank arm has an anti-friction roller 45 on its end. This construction provides a universal connection between the steering fork and crank member which is adaptable to any relative movement of the vehicle frame and the running gear and still remain in operative condition. It is adapted to variable loads on the vehicle. Any rotary motion of the steering fork in the act of steering the vehicle, however, is transmitted to the crank member without any lost motion whatever. The steering fork is curved on an arc, the center of which is substantially co-incident with the rear axle so that the crank member and steering fork are maintained in operative relation. The steering post 43 preferably rises vertically above the frame of the vehicle and carries any suitable device, such as a lever or steering wheel for actuating it. It is preferably axially alined with the vertical portion of the steering crank 17 so that both the fork and crank rotate about the same center. The steering post is supported in a bearing 46 which is preferably formed integrally with the bridge casting or arch member 4, this bearing being comparatively long to provide a substantial support for the post.

I claim:

1. The combination of an axle member, rotatable wheel supporting spindles mounted at the ends thereof, radius mechanism rotatably supported by said axle member, arms extending from said spindles, connecting links connected between said arms and said radius mechanism, a vehicle frame, springs supporting said frame on said axle for relative movement, a steering post and a slotted arm on said steering post engaging said radius mechanism to provide a universal connection between the steering post and radius connection.

2. The combination of a vehicle frame, a rotatable steering post mounted thereon, a crank arm on said steering post and having a substantially vertical, elongated slot, an axle member, spring mechanism between said frame and axle member providing relative movement thereof, wheels mounted on said axle, steering mechanism for operating said wheels, and an operating arm for said steering mechanism movable vertically in said slotted crank arm for transmitting the rotation of said steering post to said steering mechanism.

3. The combination of a vehicle frame, a rotatable steering post mounted thereon, a crank arm on said steering post and having a substantially vertical, elongated slot, an axle member, spring mechanism between said frame and axle member providing relative movement thereof, pivoted spindles on said axle, wheels on said spindles, an arm pivotally mounted on the axle, vertically movable in said slotted crank arm and adapted to be rotated by said crank arm, and means connecting said arm and said spindles.

4. The combination of a vehicle frame, an axle and springs therebetween providing for relative vertical movement, a rotatable steering post on the frame, wheels and steering mechanism therefor on said axle, horizontally extending members on said steering post and steering mechanism, and a connection between said horizontal members for transmitting rotary motion to the steering mechanism from the post and arranged to permit relative vertical movement of said members.

Signed by me at Chicago, Illinois, this 1st day of September, 1916.

GEORGE W. BULLEY.

Witnesses:
AMY JEHLE,
E. H. CLEGG.